United States Patent
Morejon Garcia et al.

(10) Patent No.: US 11,818,598 B2
(45) Date of Patent: Nov. 14, 2023

(54) DETERMINING CHANNEL OCCUPANCY FOR SIDELINK COMMUNICATION

(71) Applicant: NOKIA TECHNOLOGIES OY, Espoo (FI)

(72) Inventors: Carlos Santiago Morejon Garcia, Aalborg (DK); Nuno Manuel Kiilerich Pratas, Gistrup (DK); Rasmus Liborius Bruun, Nørresundby (DK); Lianghai Ji, Aalborg (DK); Ling Yu, Kauniainen (FI); Jakob Lindbjerg Buthler, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 136 days.

(21) Appl. No.: 17/389,932

(22) Filed: Jul. 30, 2021

(65) Prior Publication Data
US 2022/0046445 A1   Feb. 10, 2022

(30) Foreign Application Priority Data

Aug. 5, 2020  (FI) .................................... 20205783

(51) Int. Cl.
*H04W 72/542* (2023.01)
*H04W 24/08* (2009.01)
*H04B 17/318* (2015.01)

(52) U.S. Cl.
CPC .......... *H04W 24/08* (2013.01); *H04B 17/318* (2015.01); *H04W 72/542* (2023.01)

(58) Field of Classification Search
CPC ... H04W 24/08; H04W 72/542; H04W 92/18; H04W 74/002; H04W 52/383; H04W 74/0808; H04W 4/70; H04B 17/318
See application file for complete search history.

(56) References Cited

U.S. PATENT DOCUMENTS

2018/0234973 A1   8/2018  Lee et al.
2019/0246384 A1*  8/2019  Shao ................... H04W 72/044
(Continued)

FOREIGN PATENT DOCUMENTS

CN   106900005 A   6/2017
CN   109565704 A   4/2019
(Continued)

OTHER PUBLICATIONS

Communication pursuant to Article 94(3) EPC dated Jan. 17, 2023, corresponding to European Patent Application No. 21186974.8.
(Continued)

*Primary Examiner* — Edan Orgad
*Assistant Examiner* — Malick A Sohrab
(74) *Attorney, Agent, or Firm* — SQUIRE PATTON BOGGS (US) LLP

(57) ABSTRACT

Disclosed is a method comprising receiving, by a first terminal device, a first transmission from a second terminal device. The first terminal device measures a channel busy ratio over a first time window. The first terminal device determines a channel occupancy ratio of the second terminal device based at least partly on the received first transmission. The first terminal device updates the channel busy ratio based at least partly on the determined channel occupancy ratio and the measured channel busy ratio. The first terminal device determines one or more sidelink transmission parameters based at least partly on the updated channel busy ratio.

20 Claims, 7 Drawing Sheets

(56) References Cited

U.S. PATENT DOCUMENTS

| | | | |
|---|---|---|---|
| 2019/0261216 A1 | 8/2019 | Lee et al. | |
| 2019/0313279 A1 | 10/2019 | Li et al. | |
| 2020/0107330 A1* | 4/2020 | Chae | H04W 72/542 |
| 2020/0128436 A1* | 4/2020 | Chae | H04B 7/0695 |
| 2020/0128470 A1* | 4/2020 | Mok | H04W 76/23 |
| 2020/0145867 A1* | 5/2020 | Tseng | H04W 24/10 |
| 2020/0187252 A1 | 6/2020 | Lee et al. | |
| 2020/0359257 A1* | 11/2020 | Kim | H04W 72/20 |
| 2021/0051653 A1* | 2/2021 | Park | H04W 8/22 |
| 2021/0314112 A1* | 10/2021 | Balasubramanian | H04L 5/001 |
| 2021/0400509 A1* | 12/2021 | Lee | H04W 4/40 |

FOREIGN PATENT DOCUMENTS

| | | |
|---|---|---|
| CN | 109845376 A | 6/2019 |
| CN | 110249690 A | 9/2019 |
| CN | 110944350 A | 3/2020 |
| CN | 111356240 A | 6/2020 |
| CN | 111492709 A | 8/2020 |
| WO | 2018/135905 A1 | 7/2018 |
| WO | WO 2020/033088 A1 | 2/2020 |
| WO | WO 2020/033526 A1 | 2/2020 |

OTHER PUBLICATIONS

Extended European Search Report dated Dec. 9, 2021 corresponding to European Patent Application No. 21186974.8.

Rafael Molina-Masegosa et al., "LTE-V for Sidelink 5G V2X Vehicular Communications: A New 5G Technology for Short-Range Vehicle-to-Everything Communications," IEEE Vehicular Technology Magazine, IEEE, vol. 12, No. 4, Dec. 1, 2017, pp. 30-39, XP011673410.

3GPP TR 37.985 V16.0.0 (Jun. 2020), Technical Report, 3rd Generation Partnership Project; Technical Specification Group Radio Access Network; Overall description of Radio Access Network (RAN) aspects for Vehicle-to-everything (V2X) based on LTE and NR (Release 16), Jun. 2020.

3GPP TS 38.214 V16.2.0 (Jun. 2020), Technical Specification, 3rd Generation Partnership Project; Technical Specification Group Radio Access Network; NR; Physical layer procedures for data (Release 16), Jun. 2020.

First Office Action dated Sep. 1, 2023 corresponding to Chinese Patent Application No. 202110893875.9, with English summary thereof.

Intel Corporation, "Details of congestion control for V2V communication," R1-1702142, 3GPP TSG RAN WG1 Meeting #88, Athens, Greece, Feb. 13-17, 2017.

LG Electronics, "List of agreements for "LTE-based V2X support"," R1-1613818, 3GPP TSG RAN WG1 Meeting #87, Reno, USA, Nov. 14-18, 2016.

Qualcomm Inc., "Addition of V2X Sidelink Communication test case 24.1.19," R5-180555, 3GPP TSG-RAN WG5 Meeting #78, Athens, Greece, Feb. 26-Mar. 2, 2018.

Qualcomm Inc., "Addition of V2X Sidelink Communication test case 24.1.19," R5-181320, 3GPP TSG-RAN WG5 Meeting #78, Athens, Greece, Feb. 26-Mar. 2, 2018.

Yeomyung Yoon et al., "Balancing Power and Rate Control for Improved Congestion Control in Cellular V2X Communication Environments," IEEE Access, vol. 8, Jun. 4, 2020.

Le Wang et al., "An Improvement of IEEE 802.15.4 MAC Protocol in High-Density Wireless Sensor Networks," Journal of Kunming University of Science and Technology (Natural Science Edition), vol. 41, No. 2, Apr. 2016.

* cited by examiner

DETERMINING CHANNEL OCCUPANCY FOR SIDELINK COMMUNICATION

FIELD

The following exemplary embodiments relate to wireless communication.

BACKGROUND

In device-to-device communication, for example sidelink communication, a terminal device may be utilized such that better service may be provided for directly communicating with another terminal device. This may enable better usage of resources and enhanced user experience to a user of a terminal device.

SUMMARY

The scope of protection sought for various exemplary embodiments is set out by the independent claims. The exemplary embodiments and features, if any, described in this specification that do not fall under the scope of the independent claims are to be interpreted as examples useful for understanding various exemplary embodiments.

According to an aspect, there is provided an apparatus comprising at least one processor, and at least one memory including computer program code, wherein the at least one memory and the computer program code are configured, with the at least one processor, to cause the apparatus to: receive a first transmission from a second terminal device; measure a channel busy ratio over a first time window; determine a channel occupancy ratio based at least partly on the received first transmission; update the channel busy ratio based at least partly on the determined channel occupancy ratio and the measured channel busy ratio; and determine one or more sidelink transmission parameters based at least partly on the updated channel busy ratio, wherein the apparatus is comprised in a first terminal device.

According to another aspect, there is provided an apparatus comprising means for receiving a first transmission from a second terminal device; measuring a channel busy ratio over a first time window; determining a channel occupancy ratio based at least partly on the received first transmission; updating the channel busy ratio based at least partly on the determined channel occupancy ratio and the measured channel busy ratio; and determining one or more sidelink transmission parameters based at least partly on the updated channel busy ratio, wherein the apparatus is comprised in a first terminal device.

According to another aspect, there is provided a system comprising at least a first terminal device and a second terminal device, wherein the second terminal device is configured to transmit a first transmission to the first terminal device, and wherein the first terminal device is configured to: receive the first transmission from the second terminal device; measure a first channel busy ratio; determine a first channel occupancy ratio based at least partly on the received first transmission; update the first channel busy ratio based at least partly on the determined first channel occupancy ratio and the measured first channel busy ratio; and determine a first set of sidelink transmission parameters based at least partly on the updated first channel busy ratio.

According to another aspect, there is provided a system comprising at least a first terminal device and a second terminal device, wherein the second terminal device comprises means for transmitting a first transmission to the first terminal device, and wherein the first terminal device comprises means for: receiving the first transmission from the second terminal device; measuring a first channel busy ratio; determining a first channel occupancy ratio based at least partly on the received first transmission; updating the first channel busy ratio based at least partly on the determined first channel occupancy ratio and the measured first channel busy ratio; and determining a first set of sidelink transmission parameters based at least partly on the updated first channel busy ratio.

According to another aspect, there is provided a method comprising receiving a first transmission from a second terminal device; measuring a channel busy ratio over a first time window; determining a channel occupancy ratio based at least partly on the received first transmission; updating the channel busy ratio based at least partly on the determined channel occupancy ratio and the measured channel busy ratio; and determining one or more sidelink transmission parameters based at least partly on the updated channel busy ratio, wherein the apparatus is comprised in a first terminal device.

According to another aspect, there is provided a computer program comprising instructions for causing an apparatus to perform at least the following: receive a first transmission from a second terminal device; measure a channel busy ratio over a first time window; determine a channel occupancy ratio based at least partly on the received first transmission; update the channel busy ratio based at least partly on the determined channel occupancy ratio and the measured channel busy ratio; and determine one or more sidelink transmission parameters based at least partly on the updated channel busy ratio, wherein the apparatus is comprised in a first terminal device.

According to another aspect, there is provided a computer readable medium comprising program instructions for causing an apparatus to perform at least the following: receive a first transmission from a second terminal device; measure a channel busy ratio over a first time window; determine a channel occupancy ratio based at least partly on the received first transmission; update the channel busy ratio based at least partly on the determined channel occupancy ratio and the measured channel busy ratio; and determine one or more sidelink transmission parameters based at least partly on the updated channel busy ratio, wherein the apparatus is comprised in a first terminal device.

According to another aspect, there is provided a non-transitory computer readable medium comprising program instructions for causing an apparatus to perform at least the following: receive a first transmission from a second terminal device; measure a channel busy ratio over a first time window; determine a channel occupancy ratio based at least partly on the received first transmission; update the channel busy ratio based at least partly on the determined channel occupancy ratio and the measured channel busy ratio; and determine one or more sidelink transmission parameters based at least partly on the updated channel busy ratio, wherein the apparatus is comprised in a first terminal device.

BRIEF DESCRIPTION OF THE DRAWINGS

In the following, various exemplary embodiments will be described in greater detail with reference to the accompanying drawings, in which.

DETAILED DESCRIPTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In the following, different exemplary embodiments will be described using, as an example of an access architecture to which the exemplary embodiments may be applied, a radio access architecture based on long term evolution advanced (LTE Advanced, LTE-A) or new radio (NR, 5G), without restricting the exemplary embodiments to such an architecture, however. It is obvious for a person skilled in the art that the exemplary embodiments may also be applied to other kinds of communications networks having suitable means by adjusting parameters and procedures appropriately. Some examples of other options for suitable systems may be the universal mobile telecommunications system (UMTS) radio access network (UTRAN or E-UTRAN), long term evolution (LTE, the same as E-UTRA), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
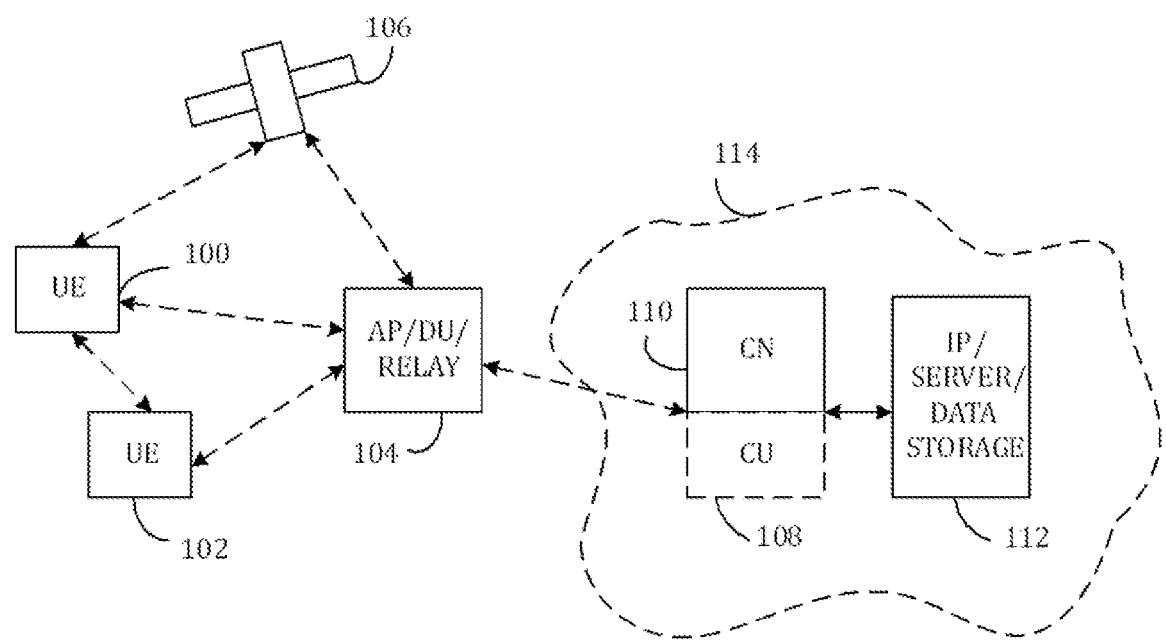
FIG. 1 illustrates an exemplary embodiment of a cellular communication network.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system may also comprise other functions and structures than those shown in FIG. 1.

The exemplary embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB may be called uplink or reverse link and the physical link from the (e/g)NodeB to the user device may be called downlink or forward link. It should be appreciated that (e/g)NodeBs or their functionalities may be implemented by using any node, host, server or access point etc. entity suitable for such a usage.

A communication system may comprise more than one (e/g)NodeB, in which case the (e/g)NodeBs may also be configured to communicate with one another over links, wired or wireless, designed for the purpose. These links may be used for signaling purposes. The (e/g)NodeB may be a computing device configured to control the radio resources of communication system it is coupled to. The NodeB may also be referred to as a base station, an access point or any other type of interfacing device including a relay station capable of operating in a wireless environment. The (e/g)NodeB may include or be coupled to transceivers. From the transceivers of the (e/g)NodeB, a connection may be provided to an antenna unit that establishes bi-directional radio links to user devices. The antenna unit may comprise a plurality of antennas or antenna elements. The (e/g)NodeB may further be connected to core network 110 (CN or next generation core NGC). Depending on the system, the counterpart on the CN side may be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface may be allocated and assigned, and thus any feature described herein with a user device may be implemented with a corresponding apparatus, such as a relay node. An example of such a relay node may be a layer 3 relay (self-backhauling relay) towards the base station.

The user device may refer to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example may be a camera or video camera loading images or video clips to a network. A user device may also be a device having capability to operate in Internet of Things (IoT) network which is a scenario in which objects may be provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation may be carried out in the cloud. The user device (or in some exemplary embodiments a layer 3 relay node) may be configured to perform one or more of user equipment functionalities. The user device may also be called a subscriber unit, mobile station, remote terminal, access terminal, user terminal, terminal device, or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question may have inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G may enable using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications may support a wide range of use cases and related applications including video streaming, augmented reality, different ways of data sharing and various forms of machine type applications (such as (massive) machine-type communications (mMTC), including vehicular safety, different sensors and real-time control. 5G may be expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage may be provided by the LTE, and 5G radio interface access may come from small cells by aggregation to the LTE. In other words, 5G may support both inter-RAT operability (such as LTE-5G) and inter-RI operability (inter-radio interface operability, such as below 6 GHz-cmWave, below 6 GHz-cmWave-mmWave). One of the concepts considered to be used in 5G networks may be network slicing in which multiple independent and dedicated virtual sub-networks (network instances) may be created within the same infrastructure to run services that have different requirements on latency, reliability, throughput and mobility.

The current architecture in LTE networks may be fully distributed in the radio and fully centralized in the core network. The low latency applications and services in 5G may require to bring the content close to the radio which leads to local break out and multi-access edge computing (MEC). 5G may enable analytics and knowledge generation to occur at the source of the data. This approach may require leveraging resources that may not be continuously connected to a network such as laptops, smartphones, tablets and sensors. MEC may provide a distributed computing environment for application and service hosting. It may also have the ability to store and process content in close proximity to cellular subscribers for faster response time. Edge computing may cover a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system may also be able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It may also be possible that node operations will be distributed among a plurality of servers, nodes or hosts. Application of cloudRAN architecture may enable RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent. Some other technology advancements that may be used may be Big Data and all-IP, which may change the way networks are being constructed and managed. 5G (or new radio, NR) networks may be designed to support multiple hierarchies, where MEC servers may be placed between the core and the base station or nodeB (gNB). It should be appreciated that MEC may be applied in 4G networks as well.

5G may also utilize satellite communication to enhance or complement the coverage of 5G service, for example by providing backhauling. Possible use cases may be providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may also comprise other apparatuses, such as physical layer relay nodes or other network elements, etc. At least one of the (e/g)NodeBs or may be a Home(e/g)nodeB. Additionally, in a geographical area of a radio communication system, a plurality of different kinds of radio cells as well as a plurality of radio cells may be provided. Radio cells may be macro cells (or umbrella cells) which may be large cells having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. In multilayer networks, one access node may provide one kind of a cell or cells, and thus a plurality of (e/g)NodeBs may be required to provide such a network structure.

For fulfilling the need for improving the deployment and performance of communication systems, the concept of "plug-and-play" (e/g)NodeBs may be introduced. A network which may be able to use "plug-and-play" (e/g)Node Bs, may include, in addition to Home (e/g)NodeBs (H(e/g) nodeBs), a home node B gateway, or HNB-GW (not shown in FIG. 1). A HNB Gateway (HNB-GW), which may be installed within an operator's network, may aggregate traffic from a large number of HNBs back to a core network.

Channel busy ratio, CBR, based transmission parameter adaptation may be supported for example in the LTE and NR sidelink, SL, for UE-autonomous resource selection mode, for example SL mode 4 in LTE vehicle-to-everything, V2X, communication and NR SL mode 2. SL is a communication mechanism for direct device-to-device communication for example between two UEs. The amount of SL resources that one SL UE uses may be denoted for example as the channel occupancy ratio, CR, which indicates the ratio of the occupied SL resources for transmitting the SL traffic with a corresponding priority value by the UE itself. In other words, the channel occupancy ratio may be defined as the ratio of time-and-frequency resources when the channel is occupied by the UE, for example containing one or more signals in addition to noise, in comparison to the overall available time-and-frequency resources for transmitting SL traffic. Accordingly, the maximal amount of SL resources that an SL UE may use may be limited by a channel occupancy ratio limit, CR-Limit, which may be configured at the radio resource control, RRC, layer and derived at the physical layer. The value of CR-Limit may be related to traffic priority and the channel busy ratio, CBR, where the CBR indicates the portion of sub-channels in the resource pool over the CBR measurement time window, whose sidelink received signal strength indicator, SL-RSSI, measured by the UE exceeds a pre-defined threshold. In other words, the CBR may be defined as the proportion of the channel that has been occupied by other nearby SL UEs within the CBR measurement time window.

If a UE is configured with a list of higher layer parameter CR-Limit and transmits in a physical sidelink shared channel, PSSCH, in slot n, the UE may ensure the following limits for any priority value k, for example according to 3GPP TS 38.214:

$$\sum_{i \geq k} CR(i) \leq CR_{Limit}(k)$$

where CR(i) denotes the CR evaluated in slot n-N for the PSSCH transmissions with the priority field in the sidelink control information, SCI, set to i, and $CR_{Limit}(k)$ corresponds to the higher layer parameter CR-Limit that is associated with the priority value k and the CBR range, which comprises the CBR measured in slot n-N, where N denotes the congestion control processing time.

Thus, the CR-Limit parameter may be used to avoid overcrowding resources and creating contention and/or collisions due to the transmission from an SL UE. In other words, the amount of SL resources that the UE may use for transmitting the SL traffic should not exceed the pre-defined CR-Limit threshold, whose value may be set by taking into account the traffic priority and the CBR measured via the PC5 interface. As an example, when the UE measures a high CBR from the PC5 interface, it may indicate that the SL channel is overloaded. Thus, if the UE measures a higher CBR, the UE may have a lower CR-Limit and it may be controlled to use a smaller amount of SL resources.

As a non-limiting example, if the CBR measurement at a first UE is 90%, it indicates that 90% of the SL channel is occupied by the nearby other UE(s). In this case, the first UE may be configured for example with a CR-Limit of 2% for the considered traffic, which indicates that the first UE may only occupy 2% of the SL time-and-frequency resources for its own transmission. In another example, if the CBR measurement is 10%, the first UE may be configured with a CR-Limit of 5%, which allows the first UE to occupy more SL resources for its SL transmission, compared to the previous example.

It should be noted that SL congestion control may also be used for other use cases than V2X communication, where a large density of traffic participants may exchange their local information by using SL communication and the data traffic may refer to a small burst transmission. These additional use cases may include for example network controlled interactive service, NCIS. However, the additional use cases may have different characteristics compared to V2X communication, such as a high data rate requirement between two SL UEs to support augmented reality or virtual reality type of services, as an example. Thus, in order to provide a wider coverage for example for NR SL to support these use cases, enhancements to the current NR SL solution may be required.

As mentioned above, in NR SL mode 2, CBR based transmission adaptation may be used to control the congestion of the channel by limiting the number of resources a UE may use for its SL transmission. In an exemplary scheme comprising two SL UEs with half-duplex capabilities, there may be an SL unicast transmission between the first UE and the second UE requiring a high data rate traffic, for example augmented reality or virtual reality type of services. In order to meet the high data rate requirement, each SL UE may require a large amount of time-and-frequency resources to perform SL transmissions. Since the amount of SL resources that an SL UE may use is impacted and limited by the measured CBR, the services with high data rate requirement may only be supported when the measured CBR is low. On the other hand, transmitting a high data rate service via SL may cause a high CBR to be measured by the other UE, for example the peer SL unicast UE.

In this exemplary scheme, the measured CBR at one UE may contemplate a large amount of resources that the peer UE has used for the considered high data rate service(s). Since the two SL UEs of the considered SL unicast may have a half-duplex constraint, when the second UE transmits an SL transmission to the first UE, the first UE should not transmit to the second UE at the same time. In addition, the upper layer(s), for example application layer, at the two SL UEs may also try to ensure the data traffics at the two SL UEs are generated in different timings, such that the two SL UEs may transmit sequentially instead of simultaneously. This may lead to different CBR measurement results between when the UE is transmitting and when the UE is receiving, as its peer UE may stay silent, for example without transmitting to the considered UE, while the considered UE is transmitting. Therefore, the CBR measured by the second UE may be higher than the CBR measured when the second UE actually transmits the SL transmission to the first UE. As a result, the second UE may not be able to transmit high data rate traffic due to the low CR-Limit derived from the high CBR measured. In other words, due to the high throughput SL unicast transmission from the first UE, the second UE may measure the CBR and sense that a large amount of SL resources is occupied. Thus, the congestion control scheme of the second UE may set a low CR-Limit, which prevents the second UE from using a large amount of SL resources to meet the high data rate requirement, and thus the second UE may transmit a low throughput SL unicast transmission to the first UE.

Some exemplary embodiments may provide an improved congestion control mechanism by taking into account the information obtained from the ongoing SL transmission(s). It is noted that some exemplary embodiments may operate on top of the current SL solution, for example where the CR-Limit is configured as a function of traffic priority and CBR measurement.

Figure 2:
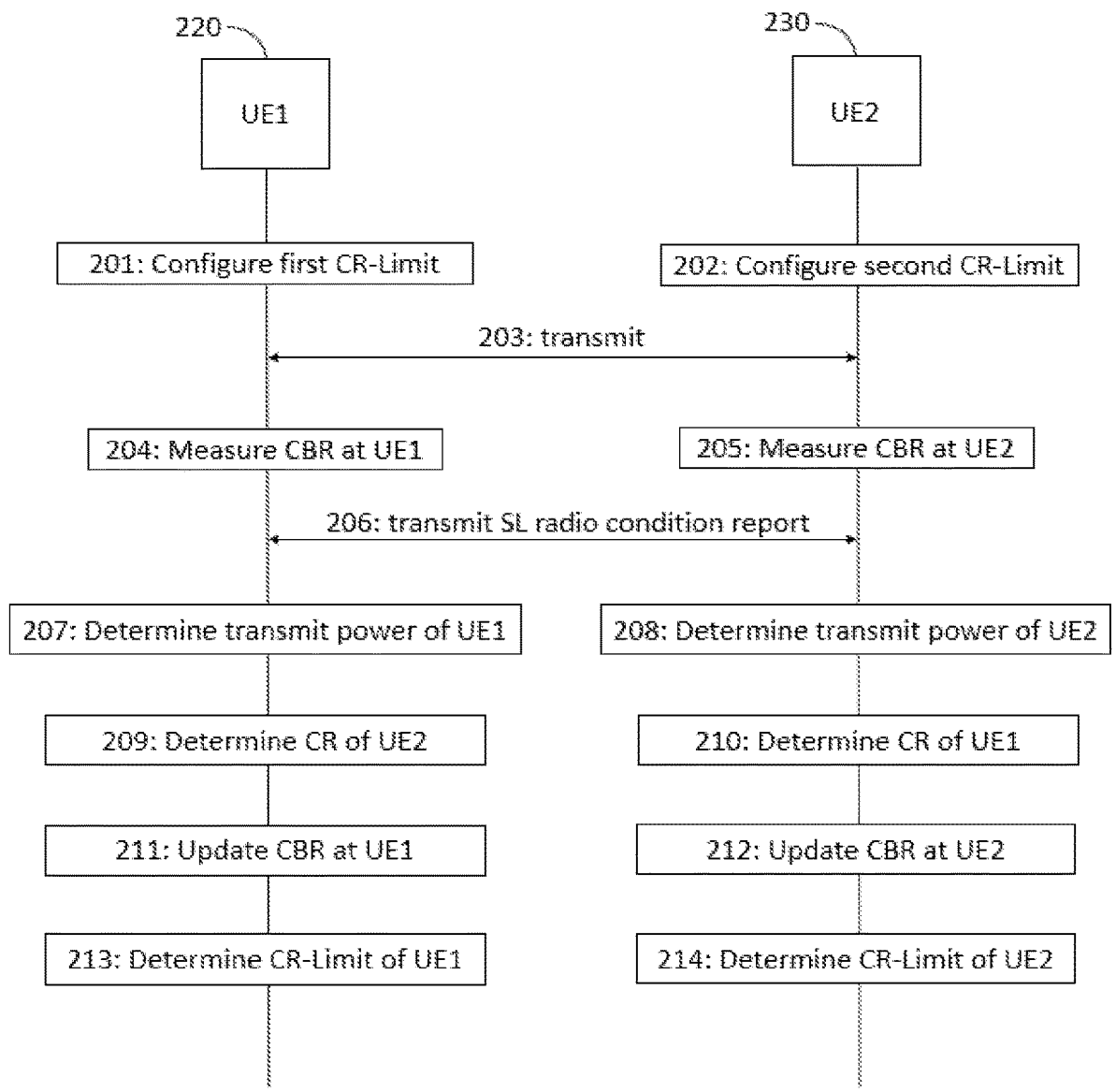
FIGS. 2-3 illustrate signalling diagrams according to exemplary embodiments.

FIG. 2 illustrates a signalling diagram according to an exemplary embodiment, wherein two UEs may be exchanging a high data traffic over sidelink.

Referring to FIG. 2, a first UE 220, denoted as UE1, is configured 201 with a first CR-Limit at the first UE as a function of SL transmit power at the first UE. A second UE 230, denoted as UE2, also configures 202 a second CR-Limit at the second UE as a function of SL transmit power at the second UE. It is noted, as mentioned before, that the CR-Limit configuration may provide a list of CR-Limit values, which may be associated as a function of, for example, traffic priority, CBR measurement, and/or SL transmit power.

In addition, the first UE 220 and the second UE 230 may be configured 201, 202 with the sidelink transmission parameters related with PC5 congestion control, for example CR-Limit, modulation and coding scheme, the SL transmit power, the maximal number of retransmissions, etc., as a function of CBR.

The first UE and the second UE then transmit 203 an SL unicast transmission to each other. However, it should be noted that the two UEs may be operating under a half-duplex constraint, i.e. they may not be able to transmit simultaneously towards each other. Therefore, the first UE may transmit a first transmission to the second UE at a first time instant, and the second UE may transmit a second transmission to the first UE at a second time instant, wherein the first time instant and the second time instant may be different time instants. The first UE then measures 204 a first CBR at the first UE, and the second UE measures 205 a second CBR at the second UE. The CBR may be measured for example from the PC5 interface.

At least one of the first UE and the second UE may transmit 206 a report to indicate the SL radio channel condition information, for example an SL channel state information, CSI, and/or a sidelink reference signal received power, SL-RSRP, report to each other. In other words, the first UE may transmit a first SL CSI and/or SL-RSRP report to the second UE, and/or the second UE may transmit a second SL CSI and/or SL-RSRP report to the first UE. The first UE may determine 207, or adjust, its own SL transmit power based on the second SL channel report received from the second UE, and/or the second UE may determine 208, or adjust, its own SL transmit power based on the first SL channel report received from the first UE. The determined SL transmit power may further be based on the measured CBR and the CR-Limit of the respective UE. An SL channel condition report may comprise information describing the received radio signal quality/strength from the transmitter to the receiver, and it may reflect the combined effect of, for example, scattering, fading, and/or power decay with distance.

The first UE then determines 209 a second CR of the second UE for this sidelink. For example, by receiving the SL transmission from the second UE, the first UE may count the amount of SL time-and-frequency resources occupied, or used, by the second UE for this SL. The second UE also determines 210 a first CR of the first UE for this sidelink. For example, by receiving the SL transmission from the first UE, the second UE may count the amount of SL time-and-frequency resources occupied, or used, by the first UE for this SL. It is noted that the CRs in step 209 and 210 may be measured over the CBR measurement time window, which may be the same as the CBR measurement time window in steps 204 and 205, respectively.

The first UE then estimates when the second UE is inactive, and updates 211 the value of the first CBR by extracting the determined second CR value from the measured first CBR. For example, the first CBR may be updated by subtracting the determined second CR value from the measured first CBR. The second UE also estimates when the first UE is inactive, and updates 212 the value of the second CBR by extracting the determined first CR value from the measured second CBR. For example, the second CBR may be updated by subtracting the determined first CR value from the measured second CBR.

The first UE then determines 213, or updates, the first CR-Limit, i.e. the CR-Limit of the first UE, based on the updated value of the first CBR and/or the determined SL transmit power of the first UE. The second UE also determines 214, or updates, the second CR-Limit, i.e. the CR-Limit of the second UE, based on the updated value of the second CBR and/or the determined SL transmit power of the second UE. The determined CR-Limit at each UE may be used for the following SL transmission(s) towards the peer UE. Thus, at least part of the above described procedure may be executed continuously, or iteratively.

In another exemplary embodiment, the updated value of the first and/or second CBR may be used to determine one or more sidelink transmission parameters related with PC5 congestion control, for example CR-Limit, modulation and coding scheme, the sidelink transmit power, maximal number of retransmissions, etc.

In another exemplary embodiment, the first UE and the second UE may be configured with a mapping from sidelink transmit power to CR-limit. For example, a lower transmit power may allow the UE to use a higher CR-limit. Thus, based on the radio condition of the considered sidelink, the first UE and the second UE may perform SL transmit power control, and determine the CR-Limit by taking into account the respective updated CBR value 211, 212, as well as the respective SL transmit power.

It is also noted that the SL transmissions between the first UE and the second UE may occur during different time instants, and, therefore, the described operations at the first UE and the described operations at the second UE may happen in different orders than illustrated in FIG. 2.

Figure 3:
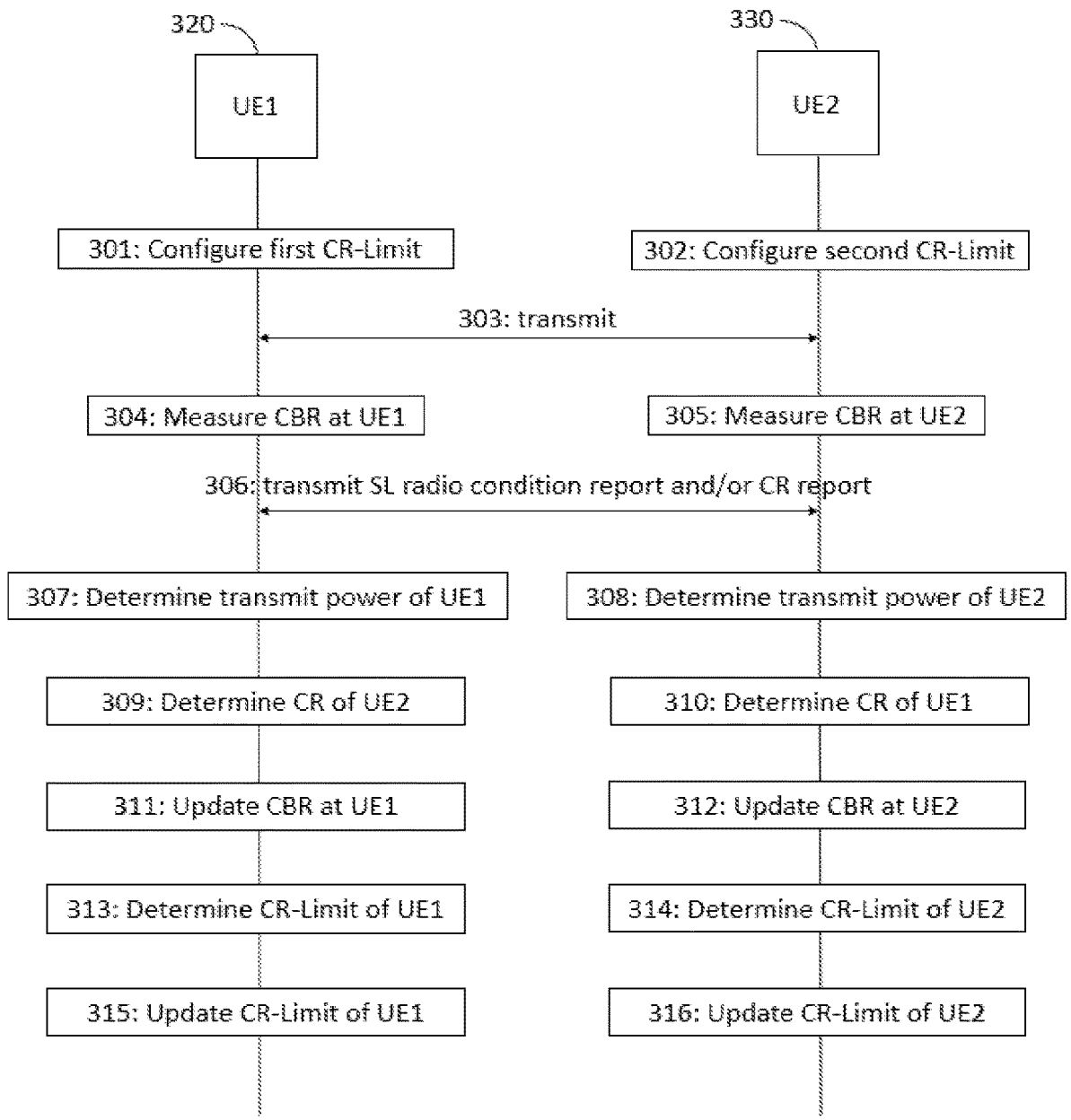

FIG. 3 illustrates a signalling diagram according to an exemplary embodiment, wherein the first UE and/or the second UE may also be transmitting to one or more other UEs, for example a third UE.

Referring to FIG. 3, a first UE 320, denoted as UE1, configures 301 a first CR-Limit at the first UE as a function of SL transmit power at the first UE. A second UE 330, denoted as UE2, also configures 302 a second CR-Limit at the second UE as a function of SL transmit power at the second UE. The CR-Limit configuration may provide a list of CR-Limit values, which may be associated as a function of, for example, traffic priority, CBR measurement, and/or SL transmit power.

The first UE and the second UE then transmit 303 an SL unicast transmission to each other. However, it should be noted that the two UEs may be operating under a half-duplex constraint, i.e. they may not be able to transmit simultaneously towards each other. Therefore, the first UE may transmit a first transmission to the second UE at a first time instant, and the second UE may transmit a second transmission to the first UE at a second time instant, wherein the first time instant and the second time instant may be different time instants. The first UE then measures 304 a first CBR at the first UE over a first CBR measurement time window, and the second UE measures 305 a second CBR at the second UE over a second CBR measurement time window.

The first UE and/or the second UE then transmit 306 an SL radio condition information report and/or a CR report to each other. In other words, the first UE may transmit a first SL radio condition information report and/or a first CR report to the second UE, and the second UE may transmit a second SL radio condition information report and/or a second CR report to the first UE. The first SL radio condition information report may comprise, for example, a first SL CSI and/or SL-RSRP report, and the second SL radio condition information report may comprise, for example, a second SL CSI and/or SL-RSRP report. The CR report may represent the overall channel occupancy ratio of the reporting UE within the CBR measurement time window, i.e. the summation of the CR for the considered sidelink between the first UE and the second UE, and one or more CRs used by the reporting UE to transmit to one or more third UEs. The configuration at the first UE and the second UE may comprise the conditions to trigger transmitting such a CR report to the peer UE. For example, the CR report transmission may be triggered either periodically or when a (pre-) defined threshold value is reached, where the (pre-)defined threshold is configured as a level of CR that is used by the reporting UE to transmit to one or more third UEs. The threshold may be configured by UE implementation, and/or by a network, for example by a base station, via dedicated signalling or broadcasted signalling, and/or by the peer UE, for example by using a PC5-RRC message.

The CR report may further comprise additional information, for example detailed report(s) regarding SL resource usage(s), to the peer UE of the considered sidelink and/or to one or more third UEs. The detailed report(s) may be directly applied at the receiving UE of the considered sidelink to update its CBR measurement and, thus, the receiving UE itself may not need to count the amount of SL resources occupied by the peer transmitting UE. In addition, the CR report may further comprise detailed information regarding the SL resources to be used by the reporting UE for transmitting to the peer UE. In this case, upon the peer UE receiving the CR report, it may select other SL resources, for example the SL resources not overlapping with the reporting UE's resources in time-domain, which may solve the half-duplex problem of the considered sidelink.

The first UE determines 307, or adjusts, its own SL transmit power based on the second SL radio condition information report received from the second UE, and the second UE determines 308, or adjusts, its own SL transmit power based on the first SL radio condition information report received from the first UE. The determined SL transmit power may further be based on the measured CBR and the CR-Limit of the respective UE.

The first UE then determines 309 a second CR of the second UE for this sidelink over the CBR measurement time window of the first UE. For example, by receiving the SL transmission from the second UE, the first UE may count the amount of SL resources occupied, or used, by the second UE for this SL over the first CBR measurement time window of the first UE. The second UE also determines 310 a first CR of the first UE for this sidelink over the second CBR measurement time window of the second UE. For example, by receiving the SL transmission from the first UE, the second UE may count the amount of SL resources occupied, or used, by the first UE for this SL over the second CBR measurement time window.

The first UE then estimates when the second UE is inactive, and updates 311 the value of the first CBR by extracting the determined second CR value from the measured first CBR. For example, the first CBR may be updated by subtracting the determined second CR from the measured first CBR. The second UE also estimates when the first UE is inactive, and updates 312 the value of the second CBR by extracting the determined first CR value from the measured second CBR. For example, the second CBR may be updated by subtracting the determined first CR from the measured second CBR.

The first UE then determines 313, or updates, the first CR-Limit, i.e. the CR-Limit of the first UE, based on the updated value of the first CBR and/or the determined SL transmit power of the first UE. The second UE also determines 314, or updates, the second CR-Limit, i.e. the CR-Limit of the second UE, based on the updated value of the second CBR and/or the determined SL transmit power of the second UE.

The updated value of the first and/or second CBR may also be used to determine one or more sidelink transmission parameters related with PC5 congestion control, for example CR-Limit, modulation and coding scheme, the sidelink transmit power, maximal number of retransmissions, etc.

The first UE then updates 315 the first CR-Limit based on the second CR report received from the second UE. In other words, the first CR-Limit is determined by taking into account the second UE's SL transmissions over the considered sidelink, i.e. between the first UE and the second UE, as well as to one or more third UEs. For example, the first CR-Limit may be updated by calculating:

$$\text{CR-Limit1} = \min(\text{CR-Limit1}, 1-(\text{CR2}_{overall} - \text{CR2}))$$

wherein CR-Limit1 denotes the first CR-Limit, $\text{CR2}_{overall}$ denotes the second CR report, and CR2 denotes the second CR. Since the peer SL UE, i.e. the second UE, may have a half-duplex constraint, the derived CR-Limit from this exemplary embodiment may indicate the maximal amount of SL resources that may be used by the first UE to transmit to the second UE, in order to avoid the second UE transmitting to a third UE at the same time when the first UE is transmitting to the second UE.

The second UE also updates 316 the second CR-Limit based on the first CR report received from the first UE. For example, the second CR-Limit may be updated by calculating:

$$\text{CR-Limit2} = \min(\text{CR-Limit2}, 1-(\text{CR1}_{overall} - \text{CR1}))$$

wherein CR-Limit2 denotes the second CR-Limit, $\text{CR1}_{overall}$ denotes the first CR report, and CR1 denotes the first CR. The determined CR-Limit at each UE may be used for the following SL transmission(s) towards the peer UE. Thus, at least part of the above described procedure may be executed continuously, or iteratively.

Figure 4:
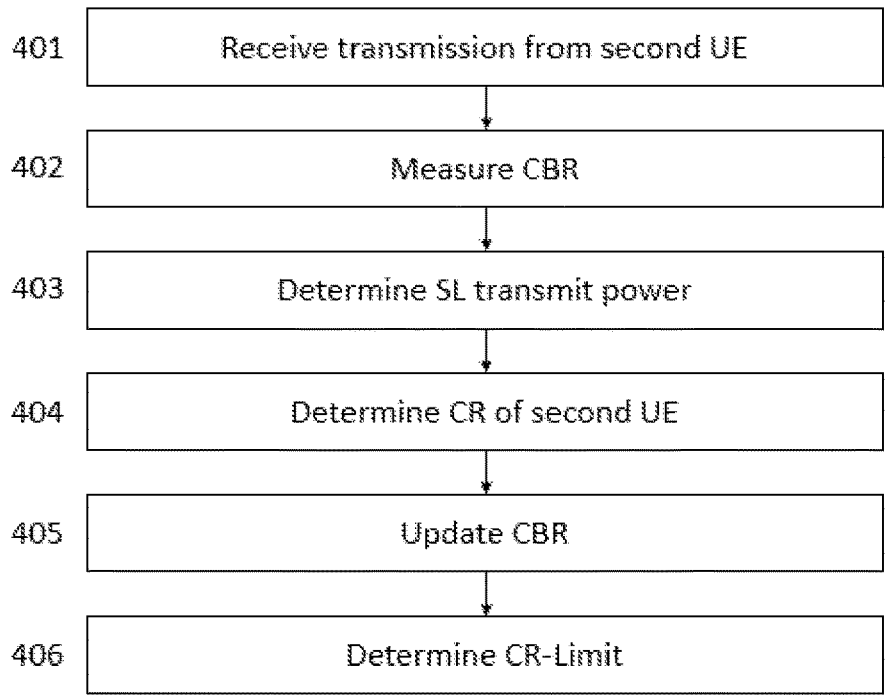
FIGS. 4-10 illustrate flow charts according to some exemplary embodiments.

FIG. 4 illustrates a flow chart according to an exemplary embodiment. Referring to FIG. 4, a first UE receives 401 a sidelink unicast transmission, which may also be referred to as a first transmission, from a second UE. The first UE measures 402 the CBR over a CBR measurement time window. The first UE then determines 403 the SL transmit power of the first UE based on sidelink radio condition information, for example an SL CSI or SL-RSRP report, received from the second UE.

The first UE then determines 404 the CR value of the second UE over the CBR measurement time window that may be the same as the window in step 402. For example, by receiving the sidelink unicast transmission from the second UE, the first UE may count the amount of SL resources occupied, or used, by the second UE for this SL. This may be done by receiving the SL transmission, which is associated with the ID(s) of the considered sidelink, for example layer-2 ID(s) and/or application layer ID(s). Alternatively, an SL resource may be considered as occupied only by the considered sidelink, if the difference between the SL-RSRP and the SL-RSSI is below a pre-defined threshold, for example the (pre-)configured SL-RSSI level used to derive CBR measurement. This may ensure that the SL resource occupied by the second UE is not occupied by one or more fourth UE(s) as well.

The first UE then updates 405 the measured CBR from step 402 by extracting the determined CR value in step 404, or a (pre-)configured ratio of the determined CR value, from the measured CBR. For example, the CBR may be updated by subtracting the determined CR from the measured CBR over the same CBR measurement time window. As a non-limiting example, if the measured CBR value is 0.4 and the determined CR value of the considered sidelink from the second UE is 0.3, then the updated CBR is 0.1. As another example, an SL resource may be considered as occupied only by the considered sidelink, if the difference between the SL-RSRP from the second UE and the SL-RSSI is below a (pre-)configured threshold, for example the (pre-)configured SL-RSSI level used to derive CBR measurement. This may ensure that the SL resource occupied by the second UE is not occupied by one or more fourth UE(s) as well. Otherwise, if the difference between the sidelink reference signal received power from the second UE, SL-RSRP, and the SL-RSSI from an SL resource is above or equal to a pre-defined threshold, the corresponding SL resource should be counted as occupied by at least one fourth UE and it should not be extracted from the CBR obtained in step 402.

The first UE then determines 406 the CR-Limit of the first UE based on the updated CBR and/or the determined SL transmit power. For example, if the updated CBR in step 405 has a lower value than the measured CBR in step 402, the CR-Limit may be increased. In addition, the UE may be configured with a mapping from sidelink transmit power to the CR-Limit. For example, a lower transmit power may allow the first UE to use a higher CR-limit. This may allow a higher spectral efficiency due to the introduced resource-reuse gain, when the first UE transmits with a low power. Thus, based on the radio condition of the considered sidelink, the first UE may perform SL transmit power control, and determine the CR-Limit by taking into account both the updated CBR value and the SL transmit power.

Figure 5:
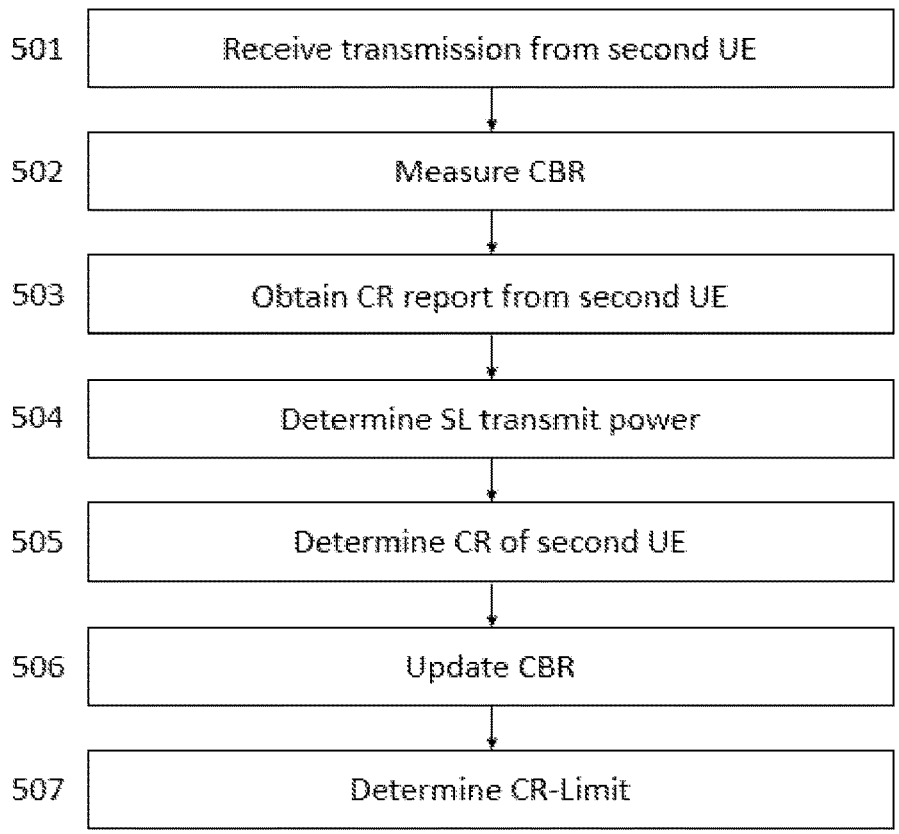

FIG. 5 illustrates a flow chart according to an exemplary embodiment. Referring to FIG. 5, a first UE receives 501 a sidelink unicast transmission, which may also be referred to as a first transmission, from a second UE. The first UE measures 502 the CBR over a CBR measurement time window.

The first UE then obtains 503, or receives, a CR report from the second UE for example via a PC5 interface. The CR report may be a summation of the CR used for the considered sidelink transmission from the second UE to the first UE, and for one or more other sidelink transmissions from the second UE to one or more third UEs. The CR report may be comprised for example in the first transmission or in a separate transmission.

The first UE then determines 504 the SL transmit power of the first UE for example based on an SL radio condition report received from the second UE. The SL radio condition report may be comprised for example in the first transmission or in a separate transmission.

The first UE then determines 505 the CR value of the second UE for the considered SL unicast transmission from the second UE to the first UE. For example, by receiving the sidelink unicast transmission from the second UE, the first UE may count the amount of SL resources occupied, or used, by the second UE for this SL. This may be done by receiving the SL transmission, which is associated with the ID(s) of the considered sidelink, for example layer-2 ID(s) and/or application layer ID(s). Alternatively, an SL resource may be considered as occupied for the considered sidelink, if the difference between the SL-RSRP from the second UE and the SL-RSSI is below a pre-defined threshold, for example the (pre-)configured SL-RSSI level used to derive CBR measurement. This may ensure that the SL resource occupied by the second UE is not occupied by one or more fourth UEs as well.

The first UE then updates 506 the CBR measured in step 502 by extracting the determined CR value in step 505, or a (pre-)configured ratio of the determined CR value, from the measured CBR. For example, the CBR may be updated by subtracting the determined CR from the measured CBR. As a non-limiting example, if the measured CBR value is 0.4 and the determined CR value of the considered sidelink from the second UE is 0.3, then the updated CBR is 0.1. As another example, an SL resource may be considered as occupied only by the considered sidelink, if the difference between the SL-RSRP from the second UE and the SL-RSSI is below a (pre-)configured threshold, for example the (pre-)configured SL-RSSI level used to derive the CBR measurement. This may ensure that the SL resource occupied by the second UE is not occupied by one or more fourth UE(s) as well. Otherwise, if the difference between the SL-RSRP from the second UE and the SL-RSSI from an SL resource is above or equal to a pre-defined threshold, the corresponding SL resource may be counted as occupied by one or more fourth UEs, and it should not be extracted from the CBR obtained in step 502.

The first UE then determines 507 the CR-Limit of the first UE based on the updated CBR, the obtained CR report, and/or the determined SL transmit power. For example, if the updated CBR in step 506 has a lower value than the measured CBR in step 502, the CR-Limit may be increased. In addition, the UE may be configured with a mapping from sidelink transmit power to the CR-Limit. For example, a lower transmit power may allow the first UE to use a higher CR-limit. This may allow a higher spectral efficiency due to the introduced resource-reuse gain, when the first UE transmits with a low power. Thus, based on the radio condition of the considered sidelink, the first UE may perform SL transmit power control, and determine the CR-Limit by taking into account both the updated CBR value and the SL transmit power.

The exemplary embodiments illustrated in FIGS. 3 and 5 may enable the first UE to further take into account the second UE's SL transmission(s) to one or more third UEs. For example, if the second UE is using a CR of X % to transmit to one or more third UEs, the second UE may not be able to monitor, or receive, an SL transmission while it is transmitting to the one or more third UEs, for example due to half-duplex. Thus, these exemplary embodiments may prevent the first UE from using a CR of more than 1−X % to transmit to the second UE, in order to fulfil the half-duplex constraint at the second UE.

In another exemplary embodiment, the CR report 503 may be triggered based on a (pre-)configured threshold value. In other words, the CR report may be transmitted from the second UE to the first UE, if the CR at the second UE for transmitting to one or more third UEs is above the (pre-)configured threshold. Thus, the UEs may dynamically switch between the operation illustrated in FIG. 4 and the operation illustrated in FIG. 5 based on the pre-defined threshold. In other words, when the second UE's CR report is received by the first UE, the first UE may use the exemplary embodiment illustrated in FIG. 5. Otherwise, if no CR report is received, the first UE may use the exemplary embodiment illustrated in FIG. 4.

Figure 6:
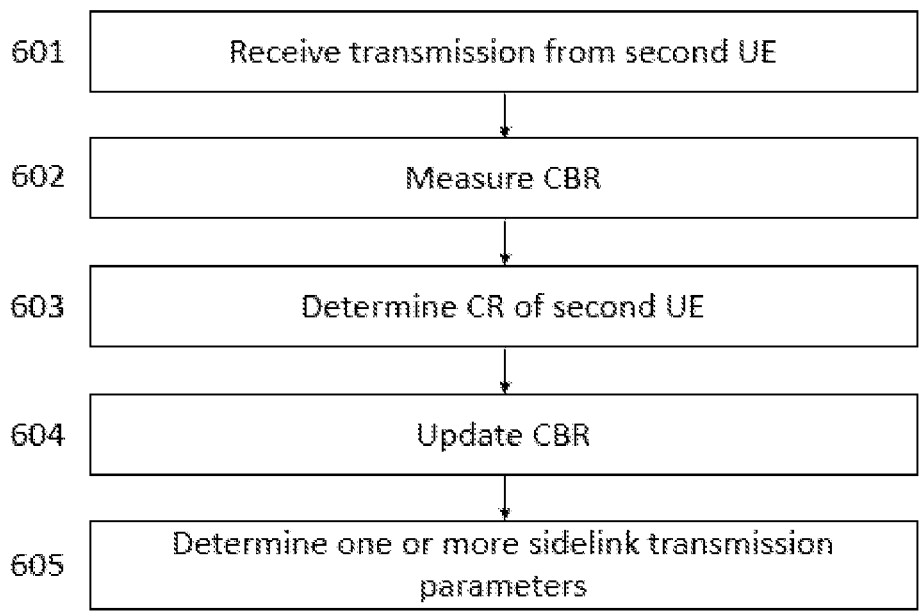

FIG. 6 illustrates a flow chart according to an exemplary embodiment. A first terminal device receives 601 a first transmission from a second terminal device. The first terminal device measures 602 a channel busy ratio over a first time window. The first terminal device determines 603 a channel occupancy ratio of the second terminal device based at least partly on the received first transmission. The first terminal device updates 604 the channel busy ratio based at least partly on the determined channel occupancy ratio and the measured channel busy ratio. The first terminal device determines 605 one or more sidelink transmission parameters based at least partly on the updated channel busy ratio. The one or more sidelink transmission parameters may comprise, for example, a channel occupancy ratio limit, a modulation and coding scheme, a sidelink transmit power, and/or a maximal number of retransmissions.

Figure 7:
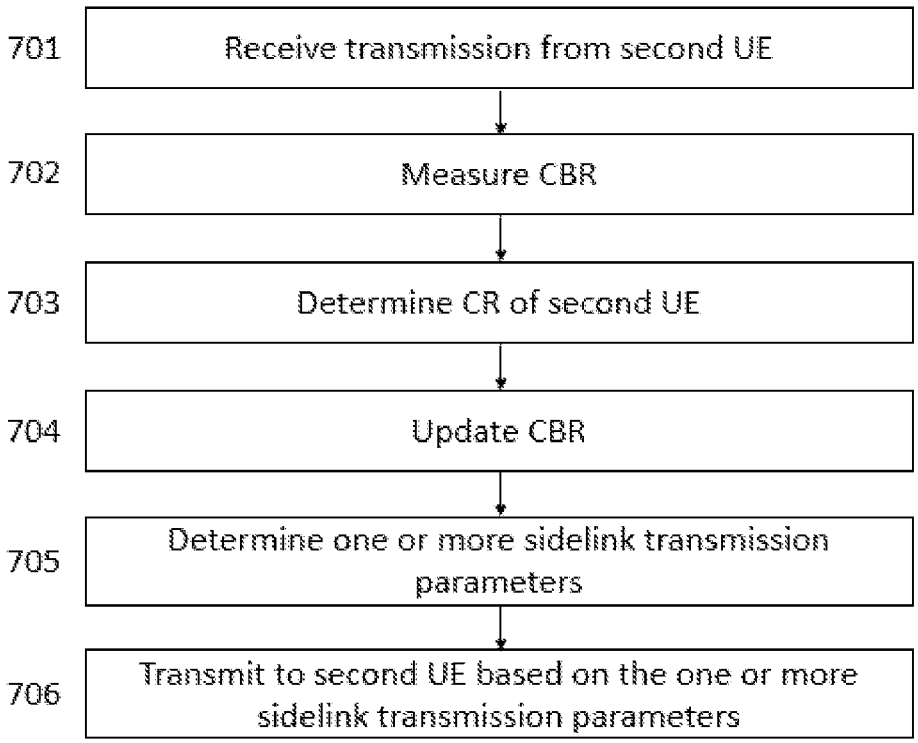

FIG. 7 illustrates a flow chart according to an exemplary embodiment. A first terminal device receives 701 a first transmission from a second terminal device. The first terminal device measures 702 a channel busy ratio over a first time window. The first terminal device determines 703 a channel occupancy ratio of the second terminal device based at least partly on the received first transmission. The first terminal device updates 704 the channel busy ratio based at least partly on the determined channel occupancy ratio and the measured channel busy ratio. The first terminal device determines 705 one or more sidelink transmission parameters based at least partly on the updated channel busy ratio. The one or more sidelink transmission parameters may comprise, for example, a channel occupancy ratio limit, a modulation and coding scheme, a sidelink transmit power, and/or a maximal number of retransmissions. The first terminal device then transmits 706 at least a second transmission to at least the second terminal device based at least partly on the determined one or more sidelink transmission parameters. A terminal device may also be referred to as a UE herein.

Figure 8:
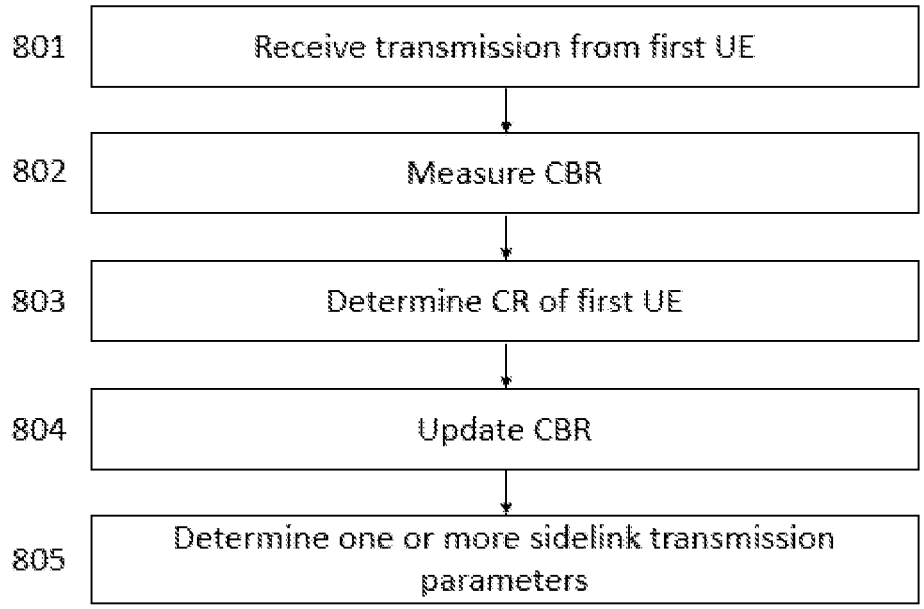

FIG. 8 illustrates a flow chart according to an exemplary embodiment. A second terminal device receives 801 a second transmission from a first terminal device. The second terminal device measures 802 a second channel busy ratio over a second time window. The second terminal device determines 803 a second channel occupancy ratio of the first terminal device based at least partly on the received second transmission. The second terminal device updates 804 the second channel busy ratio based at least partly on the determined second channel occupancy ratio and the measured second channel busy ratio. The second terminal device determines 805 one or more second sidelink transmission parameters based at least partly on the updated second channel busy ratio. The one or more second sidelink transmission parameters may comprise, for example, a channel occupancy ratio limit, a modulation and coding scheme, a sidelink transmit power, and/or a maximal number of retransmissions. The one or more second sidelink transmission parameters may also be referred to as a second set of sidelink transmission parameters.

Figure 9:
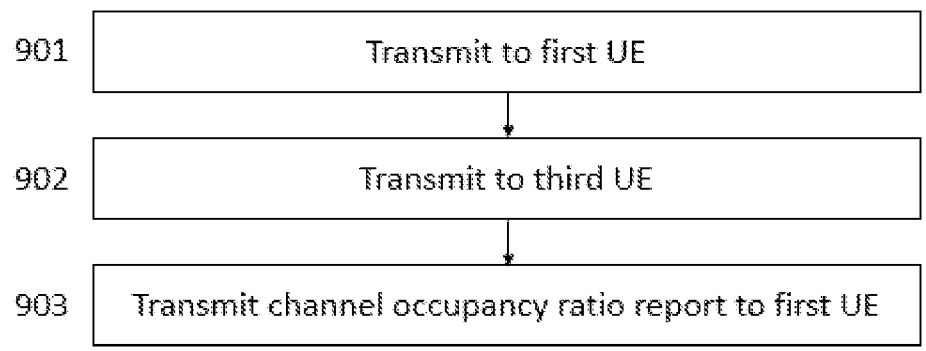

FIG. 9 illustrates a flow chart according to an exemplary embodiment. A second terminal device transmits 901 a first transmission to a first terminal device. The second terminal device further transmits 902 a third transmission to one or more third terminal devices. The second terminal device then transmits 903 a channel occupancy ratio report to the first terminal device, wherein the channel occupancy ratio report comprises a sum of at least a first channel occupancy ratio associated with the first transmission and a third channel occupancy ratio associated with the third transmission.

Figure 10:
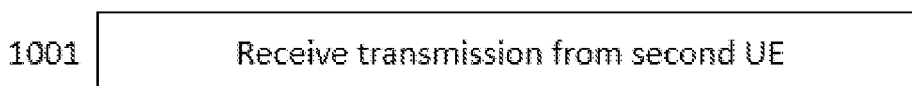

FIG. 10 illustrates a flow chart according to an exemplary embodiment. Referring to FIG. 10, a third terminal device receives 1001 a third transmission from a second terminal device.

The functions and/or blocks described above by means of FIGS. 2-10 are in no absolute chronological order, and some of them may be performed simultaneously or in an order differing from the described one. Other functions and/or blocks may also be executed between them or within them.

Some of the described exemplary embodiments may be focused on sidelink unicast for illustration. However, at least some of the exemplary embodiments may also be applicable for other scenarios, such as sidelink multicast, groupcast, and/or broadcast, where the first UE and the second UE may be communicating to each other in the sidelink multicast, groupcast, and/or broadcast.

A technical advantage provided by some exemplary embodiments may be that they may allow for example a half-duplex constrained UE to take into account the peer UE's SL transmission to adjust the SL resources that can be used for transmitting at least to the considered peer UE. In other words, the UE may exploit the information gathered from the considered sidelink to improve the traffic load measurement of the PC5 interface by taking into account the channel occupancy condition during the time when its peer UE is transmitting over the considered sidelink. The improved CBR measurement may further improve the accuracy of the CR-Limit at the considered UE, which may enable the considered sidelink to transmit high data rate traffic. Moreover, the UE may optimize usage of SL resources based on the sidelink condition and/or the SL transmit power. Furthermore, some exemplary embodiments may enable a first UE to take into account transmission(s) from a second UE to one or more third UEs, in addition to sidelink transmission(s) between the first UE and the second UE. Some of the mentioned technical advantages provided by some exemplary embodiments may be beneficial for example in scenarios, where the first UE and the second UE need to exchange high data rate traffic over sidelink.

Figure 11:
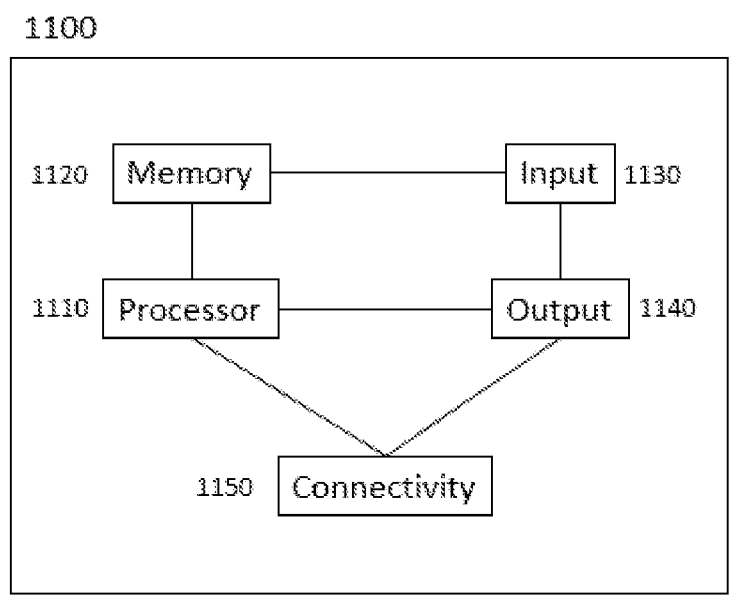
FIG. 11 illustrates an apparatus according to an exemplary embodiment.

FIG. 11 illustrates an apparatus 1100, which may be an apparatus such as, or comprised in, a UE according to an exemplary embodiment. A UE may also be referred to as a terminal device herein. The apparatus 1100 comprises a processor 1110. The processor 1110 interprets computer program instructions and processes data. The processor 1110 may comprise one or more programmable processors. The processor 1110 may comprise programmable hardware with embedded firmware and may, alternatively or additionally, comprise one or more application specific integrated circuits, ASICs.

The processor 1110 is coupled to a memory 1120. The processor is configured to read and write data to and from the memory 1120. The memory 1120 may comprise one or more memory units. The memory units may be volatile or non-volatile. It is to be noted that in some exemplary embodiments there may be one or more units of non-volatile memory and one or more units of volatile memory or, alternatively, one or more units of non-volatile memory, or, alternatively, one or more units of volatile memory. Volatile memory may be for example RAM, DRAM or SDRAM. Non-volatile memory may be for example ROM, PROM, EEPROM, flash memory, optical storage or magnetic storage. In general, memories may be referred to as non-transitory computer readable media. The memory 1120 stores computer readable instructions that are executed by the processor 1110. For example, non-volatile memory stores the computer readable instructions and the processor 1110 executes the instructions using volatile memory for temporary storage of data and/or instructions.

The computer readable instructions may have been pre-stored to the memory 1120 or, alternatively or additionally, they may be received, by the apparatus, via an electromagnetic carrier signal and/or may be copied from a physical entity such as a computer program product. Execution of the computer readable instructions causes the apparatus 1100 to perform one or more of the functionalities described above.

In the context of this document, a "memory" or "computer-readable media" or "computer-readable medium" may be any non-transitory media or medium or means that can contain, store, communicate, propagate or transport the instructions for use by or in connection with an instruction execution system, apparatus, or device, such as a computer.

The apparatus 1100 may further comprise, or be connected to, an input unit 1130. The input unit 1130 may comprise one or more interfaces for receiving input. The one or more interfaces may comprise for example one or more temperature, motion and/or orientation sensors, one or more cameras, one or more accelerometers, one or more microphones, one or more buttons and/or one or more touch detection units. Further, the input unit 1130 may comprise an interface to which external devices may connect to.

The apparatus 1100 may also comprise an output unit 1140. The output unit may comprise or be connected to one or more displays capable of rendering visual content such as a light emitting diode, LED, display, a liquid crystal display, LCD and a liquid crystal on silicon, LCoS, display. The output unit 1140 may further comprise one or more audio outputs. The one or more audio outputs may be for example loudspeakers.

The apparatus 1100 further comprises a connectivity unit 1150. The connectivity unit 1150 enables wireless connectivity to one or more external devices. The connectivity unit 1150 comprises at least one transmitter and at least one receiver that may be integrated to the apparatus 1100 or that the apparatus 1100 may be connected to. The at least one transmitter comprises at least one transmission antenna, and the at least one receiver comprises at least one receiving antenna. The connectivity unit 1150 may comprise an integrated circuit or a set of integrated circuits that provide the wireless communication capability for the apparatus 1100. Alternatively, the wireless connectivity may be a hardwired application specific integrated circuit, ASIC. The connectivity unit 1150 may comprise one or more components such as a power amplifier, digital front end, DFE, analog-to-digital converter, ADC, digital-to-analog converter, DAC, frequency converter, (de)modulator, and/or encoder/decoder circuitries, controlled by the corresponding controlling units.

It is to be noted that the apparatus 1100 may further comprise various components not illustrated in FIG. 11. The various components may be hardware components and/or software components.

As used in this application, the term "circuitry" may refer to one or more or all of the following:
    a. hardware-only circuit implementations (such as implementations in only analog and/or digital circuitry) and
    b. combinations of hardware circuits and software, such as (as applicable):
        i. a combination of analog and/or digital hardware circuit(s) with software/firmware and
        ii. any portions of hardware processor(s) with software (including digital signal processor(s)), software, and memory(ies) that work together to cause an apparatus, such as a mobile phone, to perform various functions) and
    c. hardware circuit(s) and or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of exemplary embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (for example procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The embodiments are not limited to the exemplary embodiments described above, but may vary within the scope of the claims. Therefore, all words and expressions should be interpreted broadly, and they are intended to illustrate, not to restrict, the exemplary embodiments.

The invention claimed is:

1. An apparatus, comprising:
    at least one processor; and
    at least one memory including computer program code, wherein the at least one memory and the computer program code are configured, with the at least one processor, to cause the apparatus to:
    receive a first transmission from a second terminal device;
    measure a channel busy ratio over a first time window;

determine a channel occupancy ratio based at least partly on the received first transmission;

update the channel busy ratio based at least partly on the determined channel occupancy ratio and the measured channel busy ratio, wherein the channel busy ratio is updated by subtracting at least a part of the determined channel occupancy ratio from the measured channel busy ratio; and determine a channel occupancy ratio limit based at least partly on the updated channel busy ratio and a sidelink transmit power of the apparatus;

wherein the apparatus comprises a first terminal device.

2. The apparatus according to claim 1, wherein the at least one memory and computer program code are further configured, with the at least one processor, to cause the apparatus to transmit at least a second transmission to at least the second terminal device based at least partly on the determined channel occupancy ratio limit.

3. The apparatus according to claim 1, wherein the channel occupancy ratio is determined over the first time window.

4. The apparatus according to claim 1, wherein the first transmission is associated with one or more identifiers of a sidelink transmission, and wherein the channel occupancy ratio is determined by counting an amount of sidelink resources used for the first transmission.

5. The apparatus according to claim 1, wherein the channel occupancy ratio is determined based on comparing a difference between a sidelink reference signal received power and a sidelink received signal strength indicator against a first pre-defined threshold value.

6. The apparatus according to claim 1, wherein the first transmission received from the second terminal device comprises a channel occupancy ratio report from the second terminal device; and wherein the channel occupancy ratio is determined based at least partly on the channel occupancy ratio report.

7. The apparatus according to claim 6, wherein the channel occupancy ratio report comprises a sum of at least two channel occupancy ratios, wherein at least one of the channel occupancy ratios is associated with a transmission to one or more third terminal devices from the second terminal device; and wherein the channel occupancy ratio limit is determined based at least partly on the channel occupancy ratio report.

8. The apparatus according to claim 6, wherein the channel occupancy ratio report is triggered based on a second configured or pre-configured threshold value.

9. The apparatus according to claim 1, wherein the at least one memory and computer program code are further configured, with the at least one processor, to cause the apparatus to:

receive sidelink radio condition information from the second terminal device;

determine the sidelink transmit power based at least partly on the received sidelink radio condition information.

10. A system, comprising:

at least a first terminal device; and at least a second terminal device configured to transmit a first transmission to the first terminal device, wherein the first terminal device is configured to:

receive the first transmission from the second terminal device;

measure a first channel busy ratio;

determine a first channel occupancy ratio based at least partly on the received first transmission;

update the first channel busy ratio based at least partly on the determined first channel occupancy ratio and the measured first channel busy ratio, wherein the first channel busy ratio is updated by subtracting at least a part of the determined first channel occupancy ratio from the measured first channel busy ratio; and determine a first channel occupancy ratio limit based at least partly on the updated first channel busy ratio and a first sidelink transmit power of the first terminal device.

11. The system according to claim 10, wherein the first terminal device is further configured to transmit a second transmission to the second terminal device;

wherein the second terminal device is further configured to:

receive the second transmission from the first terminal device;

measure a second channel busy ratio;

determine a second channel occupancy ratio based at least partly on the received second transmission;

update the second channel busy ratio based at least partly on the determined second channel occupancy ratio and the measured second channel busy ratio, wherein the second channel busy ratio is updated by subtracting at least a part of the determined second channel occupancy ratio from the measured second channel busy ratio; and determine a second channel occupancy ratio limit based at least partly on the updated second channel busy ratio and a second sidelink transmit power of the second terminal device.

12. The system according to claim 10, wherein the system further comprises one or more third terminal devices;

wherein the second terminal device is further configured to:

transmit a third transmission to the one or more third terminal devices;

transmit a channel occupancy ratio report to the first terminal device, wherein the channel occupancy ratio report comprises a sum of at least the first channel occupancy ratio associated with the first transmission and a third channel occupancy ratio associated with the third transmission;

wherein the one or more third terminal devices are configured to:

receive the third transmission from the second terminal device;

wherein the first terminal device is further configured to:

receive the channel occupancy ratio report from the second terminal device;

determine the first channel occupancy ratio limit based at least partly on the received channel occupancy ratio report.

13. A method, comprising:

receiving, by a first terminal device, a first transmission from a second terminal device;

measuring, by the first terminal device, a channel busy ratio over a first time window;

determining, by the first terminal device, a channel occupancy ratio based at least partly on the received first transmission;

updating, by the first terminal device, the channel busy ratio based at least partly on the determined channel occupancy ratio and the measured channel busy ratio, wherein the channel busy ratio is updated by subtracting at least a part of the determined channel occupancy ratio from the measured channel busy ratio;

determining, by the first terminal device, a channel occupancy ratio limit based at least partly on the updated channel busy ratio and a sidelink transmit power of the first terminal device.

14. The method according to claim 13, further transmitting at least a second transmission to at least the second terminal device based at least partly on the determined channel occupancy ratio limit.

15. The method according to claim 13, wherein the channel occupancy ratio is determined over the first time window.

16. The method according to claim 13, wherein the first transmission is associated with one or more identifiers of a sidelink transmission, and wherein the channel occupancy ratio is determined by counting an amount of sidelink resources used for the first transmission.

17. The method according to claim 13, wherein the channel occupancy ratio is determined based on comparing a difference between a sidelink reference signal received power and a sidelink received signal strength indicator against a first pre-defined threshold value.

18. The method according to claim 13, wherein the first transmission received from the second terminal device comprises a channel occupancy ratio report from the second terminal device; and wherein the channel occupancy ratio is determined based at least partly on the channel occupancy ratio report.

19. The method according to claim 18, wherein the channel occupancy ratio report comprises a sum of at least two channel occupancy ratios, wherein at least one of the channel occupancy ratios is associated with a transmission to one or more third terminal devices from the second terminal device; and wherein the channel occupancy ratio limit is determined based at least partly on the channel occupancy ratio report.

20. The method according to claim 18, wherein the channel occupancy ratio report is triggered based on a second configured or pre-configured threshold value.

\* \* \* \* \*